Nov. 5, 1968     R. E. CARYL     3,408,765

GOPHER TRAP

Filed Nov. 10, 1966

Inventor
Rupert E. Caryl

Wheeler, Wheeler, House & Clemency
Attorneys

United States Patent Office
3,408,765
Patented Nov. 5, 1968

3,408,765
GOPHER TRAP
Rupert E. Caryl, Downing, Wis., assignor of one-half to Verna Wigdahl
Filed Nov. 10, 1966, Ser. No. 593,337
4 Claims. (Cl. 43—88)

This invention relates to animal traps adapted to be placed in the burrow of a gopher or the like.

The present invention provides a baitless trap utilizing a novel trigger arrangement which is tripped and the trap sprung by the attempted exit of a gopher from its burrow. When the trap is in the burrow of the gopher the trigger is in a transverse plane through the burrow and spans the cross section of the burrow so that exit from the burrow without tripping the trigger is unlikely.

Other features of my invention include a trap with jaws that will hold and kill the animal and permit release of the trapped animal without the necessity of the trapper touching the animal, and a trap which is formed entirely of wire, and includes no stampings, bored holes, rivets or other types of parts which add to the cost of tooling and to the required inventory of parts required for production.

The trap is generally in the form of tongs, with jaws at one end of the tongs urged together by a coil spring at the opposite end of the tongs. The trigger is pivoted for angular displacement in the direction of movement of an animal attempting to exit from its burrow. The pivotal axis of the trigger is generally parallel to the direction of closure of the jaws and also transverse to the direction of movement of the gopher through the hole.

When the trap is to be set, the tongs are manually spread or separated from the closed position against the tension in the tong legs caused by the spring. The set position of the trap with the jaws open is maintained by two closely spaced generally parallel struts integral with each leg and extending inwardly toward the opposed leg. One strut provides a pivotal connection for a tongue which extends into an eye portion of the trigger which secures the tongue against pivotal movement when the trap is set. In the set position the tongue provides a stop or abutment against which the second strut bears as a result of the tension of the spring. The two struts are closely spaced longitudinally of the trap so that a small side thrust of the tongue at the trigger eye resists a large closing force at the point where tongue and struts meet. When a gopher or the like travels in a tunnel containing the trap, it pivots the trigger, and the tongue will be released from the eye of the trigger, permitting movement of the tongue about its pivot and accordingly removing the stop to movement of the struts laterally past each other, resulting in closure of the tong legs and the jaws on the gopher. The teeth of the jaws are inclined respectively forward and backward from the direction of jaw closing to assure against escape and to increase penetration if the animal struggles.

The trigger is arranged with respect to the jaws so that when a gopher or other animal is in a position to trip the trigger the jaws will clamp the rodent approximately in the middle and in the throat, piercing vital organs and assuring quick death.

Other objects and advantages of the invention include a trap that can be constructed entirely of wire and is relatively inexpensive to manufacture, and a trap that does not require a bait on the trigger mechanism to trap animals.

Further objects and advantages of the present invention will become apparent from the following disclosure in which:

FIGURE 1 is a full perspective view of a trap embodying various features of the invention in a set position.

FIGURE 2 is a perspective view of the trap shown in FIGURE 1 in a sprung or tripped condition.

Referring now to the drawings, FIGURE 1 shows a trap for gophers or the like in accordance with the invention designated generally 10. The trap 10 is in the form of a pair of tongs having first and second legs respectively 12 and 14 connected at one end by an integral coil spring 16 formed from stiff spring wire.

Trap 10 is provided with jaws 18 which in the disclosed construction comprise generally upwardly extending portions of the legs 12 and 14 with inwardly extending teeth 19 and 20. Any teeth 20 additional to those formed from the wire of the legs themselves may be welded or brazed to the legs. The trigger mechanism which secures legs 12 and 14 apart when the trap is set includes a first strut 22 extending inwardly generally at right angles to leg 12. Strut 22 has an eye portion 24 at the end thereof. A second strut 26 extends inwardly generally at right angles to leg 14. The second strut 26 has an upwardly curved end portion 28 forming a laterally directed seat for a tongue 30. Tongue 30 has an eye 32 linked with, and therefore pivotally connected to eye 24. Tongue 30 is also provided with an end portion 34 which may be curved to facilitate alignment of the parts.

Crossmember 38 consists of an elongated loop, encircling leg 12 with the ends 40 and 42 secured to leg 14. Crossmember 38 provides an axis for pivotal movement of trigger 36 in the direction of movement of a gopher attempting to exit from its hole, and also guides the legs, restraining any tendency to move out of a common plane. In the disclosed construction the trigger 36 comprises a generally M-shaped member with the bottom of each leg 41 pivoted to crossmember 38. At the junction of the slanting legs 43 of trigger 36 there is provided an eye 44 which removably receives the curved end 34 of tongue 30.

When the trap 10 is to be set, the legs 12 and 14 are manually separated and the end portion 34 of tongue 30 is inserted in eye 44 of the trigger, which is pivoted to its set position generally at right angles to the legs 12 and 14. The end seat portion 28 of strut 26 bears against the tongue 30 close to eye 32. The tongue 30, as a result of engagement of one end in the trigger eye 44, sidewise pressure by seat 28 of strut 26, and the pivoted connection to strut 22, becomes a part of a statically determinate structure which provides a stop or abutment opposing the thrust of strut 26 caused by spring tension in the legs 12 and 14. This static condition preventing closure of the jaws remains until pivotal movement of trigger 36 caused by pressure from an animal attempting to leave its burrow releases the tongue 30 from eye 44, thus removing the stop and permitting closure of the jaws on the animal.

The teeth 19 and 20 are pointed at their ends to kill the gopher and also extend inwardly at different angles preventing escape from trap 10 in any direction. Attempted movement of the animal will drive the teeth 19 and 20 further inwardly causing greater penetration and quicker death.

In the use of my trap, the orifice of the animal burrow can be enlarged to permit installation of the trap if necessary. The trap is then set and manually placed in the desired location.

I claim:

1. An animal trap comprising first and second legs having jaw portions at one end, a spring at the other end of said legs urging said legs together, a first strut integral with said first leg and spaced from said spring and extending inwardly toward said second leg, a second strut integral with said second leg and spaced from said spring and extending inwardly toward said first leg, a trigger pivoted for movement about an axis transverse to said legs, a tongue having one end pivoted to said first strut and the other end adapted for removable engagement with said trigger, said tongue being engaged intermediate its ends with the end of said second strut when the end of said tongue is in engagement with said trigger, thereby preventing closure of said legs in response to said spring until said trigger is displaced to release said tongue.

2. An animal trap in accordance with claim 1 wherein said trap includes a crossmember secured to one of said legs and extending around the other of said legs, said trigger is generally M-shaped with two outer legs pivotally connected to said crossmember, and said trigger further comprises an eye at the junction of the two inner legs of said M-shaped trigger, said eye being adapted to receive and retain the end of said tongue when the trap is set.

3. A trap in accordance with claim 1 wherein said jaws comprise integral extensions of said legs, said extensions having teeth extending toward each other at different angles, said teeth having sharp terminal ends adapted to pierce an animal.

4. A trap in accordance with claim 1 wherein said legs, at least two of said teeth, and said spring are all formed of a single piece of heavy resilient wire, and the remaining parts of said device are formed of similar wire.

References Cited

UNITED STATES PATENTS

| | | | |
|---|---|---|---|
| 1,135,626 | 4/1915 | Schreck | 43—94 |
| 1,377,441 | 5/1921 | Roy | 43—88 |
| 1,424,307 | 8/1922 | Hughey | 43—94 |

WARNER H. CAMP, *Primary Examiner.*